United States Patent [19]

Shih et al.

[11] Patent Number: 5,073,614

[45] Date of Patent: Dec. 17, 1991

[54] STRONGLY SWELLABLE, MODERATELY CROSSLINKED POLYVINYLPYRROLIDONE

[75] Inventors: Jenn S. Shih, Paramus; Terry E. Smith, Morristown; Jui-Chang Chuang, Wayne, all of N.J.

[73] Assignee: ISP Investments Inc., Wilmington, Del.

[21] Appl. No.: 599,592

[22] Filed: Oct. 18, 1990

[51] Int. Cl.⁵ .............................................. C08F 26/06
[52] U.S. Cl. ....................................... 526/258; 526/264
[58] Field of Search ................................. 526/258, 264

[56] References Cited

U.S. PATENT DOCUMENTS 4,873,299 10/1989 Nowakowsky et al. ............. 526/264

Primary Examiner—Joseph L. Schofer
Assistant Examiner—Alex H. Walker
Attorney, Agent, or Firm—Walter Katz; Marilyn J. Maue; Joshua J. Ward

[57] ABSTRACT

What is provided herein are strongly swellable, moderately crosslinked polyvinylpyrrolidone polymers in the form of fine, white powders characterized by (a) an aqueous swelling parameter defined by its gel volume of about 15 to 150 ml/g, (b) a Brookfield viscosity in 5% aqueous solution of at least about 10,000 cps, and (c) being prepared directly by a precipitation polymerization process in an organic solvent, in the presence of about 0.2 to 1% by weight of vinylpyrrolidone of a multifunctional crosslinking agent, preferably about 0.25 to 0.6%, and optimally, about 0.35 to 0.6%.

20 Claims, No Drawings

STRONGLY SWELLABLE, MODERATELY CROSSLINKED POLYVINYLPYRROLIDONE

BACKGROUND OF THE INVENTION

1. Field of the Invention

This invention relates to crosslinked polyvinylpyrrolidone (PVP), and more particularly, to strongly swellable, moderately crosslinked PVP polymers which are prepared directly as fine, white powders by precipitation polymerization of vinylpyrrolidone (VP).

2. Description of the Prior Art

Polyvinylpyrrolidone is made by homopolymerization of vinylpyrrolidone in bulk, solution or suspension. The polymer is obtained as (1) water soluble PVP; (2) water insoluble PVP which is variably swellable in water and which may form soft gels if strongly swellable.

(1) Water soluble PVPs usually are polymerized in aqueous solution using hydrogen peroxide. Polymerization also can take place in organic solvents such as methanol, isopropanol, toluene, benzene, tetrahydrofuran, acetone and hexane, usually with the production of lower molecular weight polymers than polymerization in water.

Belgian Patent 668,368, for example, disclosed a process for preparing homo- and copolymers of vinyl lactams in aliphatic hydrocarbons. However, the patent was limited to water soluble polymers and copolymers of vinyl pyrrolidone and vinyl caprolactam without crosslinking agents.

(2) Water insoluble polymers of VP which are variably swellable may be prepared by copolymerizing VP in the conventional manner with or without difunctional vinyl or acrylic compounds acting as crosslinking agents. However, even when different amounts of the difunctional component was used, it was not possible to prepare polymers which were only slightly swellable in water.

U.S. Pat. No. 2,938,017, for example, disclosed that insoluble polymerization products can be obtained by heating VP alone, without the addition of water but in the presence of basic alkali or alkaline earth metal compounds such as the oxides, hydroxides or alkoxides of sodium or potassium. This method produced slightly swellable polymers, which, however, showed strong discoloration due to the high temperature at which polymerization took place. Moreover, the reaction was very difficult to control under these conditions.

U.S. Pat. Nos. 3,277,066 and 3,306,886 disclosed processes for the manufacture of insoluble PVP in which VP was placed in an autoclave and heated under pressure at about 140° C. in the presence of water and catalysts such as alkali metal hydrides, alkali metal borohydrides and/or alkali or alkaline earth metal hydroxides or alkoxides until the polymerization reaction had started. These processes also produced only sparingly swellable polymers with the disadvantage that elevated temperatures were required to start the polymerization reaction, and this necessitated the use of pressure vessels when water was included.

German Patent No. 2,437,640 disclosed that VP can be polymerized in dilute aqueous solution in the presence of a crosslinking agent in the absence of oxygen and additionally in the presence of from 0.05 to 2% by weight, based on VP, of one or more ketocarboxylic acids or their methyl or ethyl esters. A small amount of a base was used concommitantly. However, polymerization at the high pH of the reaction caused yellowing of the polymers.

U.S. Pat. No. 3,933,766 described the preparation of insoluble PVP which was only slightly swellable by the so-called "popcorn" or proliferous polymerization technique. In this method, VP was polymerized to insoluble, slightly swellable, crosslinked PVP by heating an aqueous solution of VP in the presence of a bifunctional cyclic acid amide, but without any radical initiator, at about 80°-100° C.

U.S. Pat. No. 4,451,582 disclosed a process for the preparation of insoluble, particulate PVP polymers which were only slightly swellable in water. These polymers were obtained from basic vinyl heterocycles having a pKa higher than 4, and their copolymers, with as much as 30% by weight of copolymerizable monomers. The monomers were polymerized in the presence of from 0.1 to 10% by weight, based on the total amount of monomers, of a crosslinking agent, in the absence of oxygen and polymerization initiators. The polymers were preferably prepared by precipitation polymerization in water; however, they could be obtained in the absence of solvents for the monomers, by heating the latter to, preferably, 150°-180° C. This reaction was difficult to control and gave only low yields and relatively highly contaminated products.

U.S. Pat. No. 3,759,880 described a process in which VP was polymerized in aqueous solution in admixture with monomeric cyclic acid amides containing at least two ethylenically unsaturated groups of which at least one was attached to an amide nitrogen atom. The reaction was initiated in the presence of metals susceptible to attack by oxygen or in the presence of polymer seeds obtained from the monomers in the presence of such metals.

U.S. Pat. No. 4,647,637 disclosed a process for making insoluble PVP powders which were only slightly swellable by polymerization of VP and a crosslinking agent in a powder bed in the presence of a heat-transfer medium which was inert to the reactants, and in the absence of oxygen or polymerization initiator, at from 90° to 220° C., while maintaining the reactants in the powder state, circulating the reaction mass and evaporating the heat-transfer medium from the polymerization zone.

U.S. Pat. No. 2,658,058 disclosed a process for crosslinked linear PVP polymers by treatment of the polymer with hydrazine and hydrogen peroxide; U.S. Pat. No. 3,350,366 used α,ω-diolefins and hydrogen peroxide; U.S. Pat. No. 2,658,058 used persulfate; and in J. Phys. Chem. 63, 1852 (1959), crosslinking was effected by irradiation.

U.S. Pat. Nos. 4,330,451 and 4,333,112 disclosed a post-treatment process for rendering PVP more highly viscous. In this process, PVP was subjected to a heat treatment in the presence of a water-insoluble peroxide and in the absence of oxygen. However, this process suffered from the disadvantage of requiring an additional step to produce the desired high-viscosity PVP, and this step was difficult to carry out reproducibly.

Polymer J. 17 (1) p. 143-152 (1985), entitled "Polymers of N-Vinylpyrrolidone:Synthesis, Characterization and Uses", disclosed that slightly swellable, crosslinked PVP can be made by polymerizing VP chemically in aqueous solution with free radical initiators using various amounts of bifunctional monomers as crosslinking agents.

U.S. Pat. No. 3,669,103 described a process for preparing gels of lightly crosslinked PVP by aqueous, solution polymerization of VP in the presence of crosslinking agents. The reaction product was a coherent mass of gel which was evaporated to dryness and ground to provide a finely particulate product.

However, these and other processes did not provide strongly swellable, moderately crosslinked PVP polymers directly as fine, white powders which could be used to thicken aqueous and non-aqueous solutions effectively.

Accordingly, it is an object of this invention to provide strongly swellable, moderately crosslinked PVP polymers directly as fine powders by precipitation polymerization of VP in the presence of a predetermined amount of a multifunctional crosslinking agent and a free radical initiator in an organic solvent.

Yet another object of this invention is to provide strongly swellable, moderately crosslinked PVP polymer powders characterized by an aqueous gel volume of about 15-150 ml/g of polymer and a Brookfield viscosity in 5% aqueous solution of at least 10,000 cps.

Still another object of the present invention is to provide crosslinked PVP polymer powders which can show favorable white, fine powder formation during polymerization, and which can be made in a high solids content, and which provide clear solutions of high viscosities, and enhanced stability as measured by their retention of viscosity during storage at 50° C., and excellent salt tolerance.

These and other objects and features of the invention will be made apparent from the following description of the invention.

SUMMARY OF THE INVENTION

What is provided herein are strongly swellable, moderately crosslinked PVP polymers in the form of fine, white powders having (a) an aqueous gel volume of about 15 to 150 ml/g of polymer, (b) a Brookfield viscosity in 5% aqueous solution of at least about 10,000 cps, which (c) are prepared directly by precipitation polymerization of VP in the presence of a crosslinking agent in the amount of about 0.2 to about 1% by weight of VP.

In the preferred embodiment of the invention, (a) is 25 to 75 ml/g of polymer, (b) is at least 15,000 cps, and (c) is about 0.25 to 0.8%. In an optimum form of the invention, (a) is 30 to 60 ml/g, (b) is about 20,000 to 50,000 cps, and (c) is about 0.35 to 0.6%.

Gel volume is a measure of the swelling property of the crosslinked polymer and is defined as the equilibrium aqueous swelling volume of polymer per unit weight, and is expressed in the units of ml/g. Gel volume is determined by first adding 1 g. of the polymer to a suitable graduated cylinder filled with water. This mixture then is shaken and allowed to stand at room temperature for 3 days. The volume of the gel which is produced in water is measured and taken as the gel volume. Similarly, the gel volume concept can be applied to non-aqueous systems.

The fine, white powder polymers of the invention are prepared directly by a precipitation polymerization process in an organic solvent, such as an aliphatic hydrocarbon solvent, preferably cyclohexane or heptane, or an aromatic hydrocarbon, such as toluene, in the presence of about 0.2 to 1% by weight of VP of a crosslinking agent, preferably N,N'-divinylimidazolidone, triallyl-1,3,5-triazine-2,4,6(1H, 3H,5H)-trione 2,4,6-triallyloxy-1,3,5-triazine, and pentaerythritol triallyl ether at about 10 to 50% solids.

DETAILED DESCRIPTION OF THE INVENTION

In accordance with the invention, strongly swellable, moderately crosslinked PVP polymers are prepared directly in the form of fine, white powders by precipitation polymerization of vinylpyrrolidone in the presence of a predetermined amount of a crosslinking agent and free radical polymerization initiator in an organic solvent, preferably an aliphatic hydrocarbon, e.g. a $C_3$–$C_{10}$ saturated, branched or unbranched, cyclic or acyclic aliphatic hydrocarbon, and most preferably cyclohexane or heptane, or mixtures thereof.

The amount of solvent used in the process of the invention should be sufficient to dissolve an appreciable amount of the reactants and to maintain the copolymer precipitate in a stirrable state at the end of the polymerization. Generally, about 10 to 50% solids, preferably 15–30%, is maintained in the reaction mixture.

The precipitation polymerization process of the invention is carried out in the presence of a suitable free radical polymerization initiator. Suitable initiators include acyl peroxides such as diacetyl peroxide, dibenzoyl peroxide and dilauryl peroxide; peresters such as t-butylperoxy pivalate, tert-butyl peroxy-2-ethylhexanoate; peroxides such as di-tert-butyl peroxide; percarbonates such as dicyclohexyl peroxydicarbonate; and azo compounds such as 2,2'-azobis(isobutyronitrile), 2,2'-azobis(2,4-dimethylvaleronitrile), 1,1'-azobis(cyanocyclohexane), and 2,2'-azobis(methylbutyronitrile). Other initiators known in the art also may be used. A preferred initiator is the following:

| Preferred Initiator | | |
|---|---|---|
| t-Butyl peroxy-pivalate | Atochem N.A. (Lupersol 11) | Liquid; 75% active in mineral spirits |

The amount of such initiator may vary widely; generally about 0.2–5.0% is used, based on the weight of total monomers charged.

The reaction temperature may vary widely; generally the reaction mixture is maintained at about 40°–150° C., preferably 60°–70° C., during the polymerization. Pressure usually is kept at atmospheric pressure, although higher and lower pressures may be used as well.

The reaction mixture should be stirred vigorously under an inert atmosphere, e.g. nitrogen, during the polymerization. A stirring rate of about 100–600 rpm in a 1-liter lab reactor is quite adequate to effect the desired polymerization and to keep the precipitate in a stirrable state during the polymerization.

Suitable crosslinking agents for use in the invention include such multifunctional compounds as the divinyl ethers of an aliphatic diol, e.g. the divinyl ethers of 1,3-propanediol, 1,4-butanediol, 1,5-pentanediol, 1,6-hexanediol, 1,7-heptanediol, 1,8-octanediol, 1,9-nonanediol, 1,10-decanediol, 1,11-unidecanediol, and 1,12-dodecanediol; as well as the divinyl ethers of diethylene glycol, triethylene glycol, tetraethylene glycol, pentaethylene glycol, hexaethylene glycol, heptaethylene glycol, octaethylene glycol, nonaethylene glycol, decaethylene glycol and further polyalkylene glycols up to a molecular weight of about 6000. Other suitable crosslinking agents include 1,7-octadiene, 1,9-decadiene, 1,13-tetradecadiene, divinylbenzene, N-N'-divinylimidazolidone, and methylene bisacrylamide; acrylates such as polyethylene glycol diacrylate, trimethylolpropane triacrylate, propylene glycol diacrylate; allyl ether derivatives of polyhydric alcohols such as pentaerythritol triallyl ether; or polyhydric alcohols esterified once or twice with acrylic acid; triallylamine, tetraallylethylene- diamine, diallyl phthalate, and the like. Preferred crosslinking agents are the following: N,N'-divinylimidazolidone, pentaerythritol triallyl ether, triallyl-1,3,5-triazine-2,4,6(1H,3H,5H)-trione and 2,4,6-triallyloxy-1,3,5-triazine.

The precipitation polymerization process of the invention may be carried out by first precharging a suitable reactor with a predetermined amount of the organic solvent, for example, an aliphatic hydrocarbon solvent, and heating the solvent to a desired reaction temperature while stirring vigorously under an inert gas atmosphere. The initiator is then charged into the reactor. Then a solution containing selected amounts of vinylpyrrolidone monomer and the crosslinker material is admitted into the reactor over a period of time, generally about an hour or more, and preferably below the surface of the solvent. Then the reaction mixture is held for an additional period of time for polymerization to be completed. Finally, the mixture is cooled to room temperature. Filtering, washing with solvent, and drying provides the desired polymer in yields approaching quantitative. Alternatively, the reaction product may be dried directly to provide the polymer powders.

The heterogeneous polymerization process of the invention in cyclohexane or heptane solvent provides the desired PVP polymer product as a fine, white powder, which precipitates readily, in quantitative yield, with substantially the same degree of crosslinking as the charge of VP monomer and crosslinking agent, in a smooth polymerization without excessive swelling of polymer during the course of the process. More particularly, the solvents of the invention are non-solvents for PVP and enable the polymerization to proceed in the presence of crosslinking agent without excessive building up viscosity of the reaction mixture during polymerization.

The invention will be illustrated by reference to the following examples, which are given in parts by weight unless otherwise specified.

EXAMPLE 1

A 2-liter, 4-necked reaction vessel was equipped with a condenser, a constant speed mechanical stirrer, set at 170 rpm with a torque indicator and an anchor agitator having an open radius of 4 and 5/6 inches, an adaptor for admitting nitrogen, and a thermocouple connected to a temperature controller. The vessel was charged with 1000 g. of cyclohexane and heated to 65° C. during 30 minutes while purging with nitrogen. The reactor then was held at 65° C. for an additional 30 minutes. Then 520 microliters of t-butylperoxy pivalate (Lupersol 11, 75% active) polymerization indicator was added. Thereafter a solution of 250 g. of vinylpyrrolidone and 1.25 g. of N,N'-divinylimidazolidone crosslinking agent was introduced into the charged reactor over a period of 4 hours while stirring the contents. The feeding rate was about 1.0 ml./min. Then the mixture was heated to 85° C. over a half-hour and held at that temperature for another half-hour. Then the mixture was transferred to a 2-liter high pressure reactor and 1.0 g. of 2,5-dimethyl-2,6-di-(t-butylperoxy)hexane (Lupersol 101, 90% active) was added. The reactor was sealed and heated to 130° C. for 8 hours, cooled to room temperature, and the mixture was dried in a rotary evaporator. The polymer product was oven dried at 100° C. and vacuum dried at 90° C. for 16 hours of each. A quantitative yield of a crosslinked PVP polymer containing about 0.5% crosslinking agent was obtained.

EXAMPLES 2-10

The procedure of Example I was followed using various amounts of different crosslinkers with the following results.

TABLE I

| Ex. No. | VP, Amount (g) | Crosslinker* | Crosslinker, Amount (g) | % Crosslinker | **Product Yield (%) |
|---|---|---|---|---|---|
| 2 | 250 | DI | 0.25 | 0.10 | 96.0 |
| 3 | 250 | DI | 0.625 | 0.25 | 100.0 |
| 4 | 250 | DI | 2.5 | 1.00 | 100.0 |
| 5 | 250 | PTE | 0.25 | 0.10 | 93.0 |
| 6 | 250 | PTE | 0.625 | 0.25 | 92.0 |
| 7 | 250 | PTE | 2.5 | 1.00 | 94.2 |
| 8 | 250 | MBA | 0.625 | 0.25 | 87.0 |
| 9 | 250 | MBA | 1.25 | 0.50 | 96.0 |
| 10 | 250 | MBA | 2.5 | 1.00 | 100.0 |

*DI = divinylimidazolidone, PTE = pentaerythritol triallyl ether and MBA = methylene bisacrylamide
**based upon VP used, by weight

EXAMPLES 11-12

The procedure of Example 1 was followed using heptane as solvent in place of cyclohexane. The feeding rate of the solution of vinylpyrrolidone in crosslinking agent was 0.50-0.55 ml./min. The results are shown in Table II below.

TABLE II

| Ex. No. | VP, Amount (g) | Crosslinker | Amount (g) | % Crosslinker | Product Yield (%) |
|---|---|---|---|---|---|
| 11 | 200 | DI | 1.0 | 0.50 | 95.6 |
| 12 | 250 | PTE | 1.25 | 0.50 | 91.5 |

DI - Divinylimidazolidone
PTE - Pentaerythritol triallylether

EXAMPLE 13

The reactor of Example 1 was provided with the anchor agitator positioned in the middle of the reactor and extended to within 2 inches of the bottom of the reactor. Two dip tubes were connected to two metering pumps. The thus-equipped reactor then was charged with the solvent which filled the reactor to about 4 inches above the bottom of the dip tubes. In this procedure, the solution of VP and crosslinking agent was admitted into the reactor through the dip tubes to a position below the surface of the solvent. The effect of such subsurface feeding of monomer-crosslinker solution was to reduce build-up of viscosity of the polymer product during the polymerization, resulting in a smoother course for the process, particularly with respect to effective stirring of the reaction mixture.

Properties of Polymer of Invention

The strongly swellable, moderately crosslinked PVP polymer powders of the invention are characterized by its unique gel volume and viscosity, which properties enable the polymer to thicken aqueous and non-aqueous solutions effectively.

The viscosity of the polymer is defined by its Brookfield viscosity in cps, which is determined upon a 5% aqueous solution of the polymer at 25° C. by a standard analytical procedure using Model LTV and Spindle No. 4.

For maximum utility, it is desirable that the hydrated polymer exhibit a high gel volume and a high viscosity. With increasing crosslinking density in the polymer, the gel volume decreases and viscosity increases and then decreases, passing through a maximum. In the crosslinked polymer system of this invention, an effective thickener product is provided by including crosslinker in the reaction mixture at a suitable concentration of about 0.2 to 1.0 % by weight, based upon VP, preferably about 0.25 to 0.8%, and optimally, at about 0.35 to 0.6%. At this suitable amount of crosslinker loading, the crosslinked polymer product exhibits a gel volume of about 15 to 150 ml/g of polymer and a Brookfield viscosity of at least 10,000 cps. At the preferred crosslinker concentration, the gel volume is about 25 to 75 ml/g of polymer and its Brookfield viscosity is at least 15,000 cps. At the optimal amount crosslinker present in the reaction mixture, the polymer exhibits a gel volume of about 30 to 60 ml/g of polymer and a Brookfield viscosity of about 20,000 to 50,000 cps.

The viscosity of the crosslinked polymer of the invention is particularly substantially independent of extended storage time even at 50° C., and of pH, and is tolerant of monovalent and multivalent salts in solution.

As an added feature of the invention, the residual VP monomer content of the polymers obtained herein is less than about 0.1% by weight. In aqueous based processes, in contrast, the formation of a gel mass during polymerization may trap considerable amounts of VP monomer in the polymeric gel network.

While the invention has been described with particular reference to certain embodiments thereof, it will be understood that changes and modifications may be made which are within the skill of the art. Accordingly, it is intended to be bound only by the following claims.

What is claimed is:

1. Strongly swellable, moderately crosslinked polyvinylpyrrolidone in the form of fine, white powders having (a) an aqueous gel volume of about 15 to 150 ml/g of polymer, (b) a Brookfield viscosity in 5% aqueous solution of at least about 10,000 cps, and (c) being prepared directly by precipitation polymerization of monomers consisting essentially of vinyl pyrrolidone in an organic solvent in the presence of a crosslinking agent in the amount of about 0.2 to about 1% by weight of vinyl pyrrolidone and a free radical polymerization initiator.

2. Strongly swellable, moderately crosslinked polyvinylpyrrolidone powders according to claim 1 wherein (a) is about 25 to 75 ml/g of polymer, (b) is at least about 15,000 cps, and (c) is about 0.25 to 0.8%.

3. Strongly swellable, moderately crosslinked polyvinylpyrrolidone powders according to claim 1 wherein (a) is about 30 to 60 ml/g of polymer; (b) is about 20,000 to 50,000 cps; and (c) is about 0.35 to 0.6%.

4. Polyvinylpyrrolidone powders according to claim 1 wherein (b) is substantially independent of pH and is tolerant of salts.

5. Polyvinylpyrrolidone powders according to claim 1 having less than about 0.1% by weight residual VP monomer therein.

6. Polyvinylpyrrolidone powders according to claim 1 in which said crosslinking agent is selected from N,N'-divinylimidazolidone, pentaerythritol triallyl ether, triallyl-1,3,5-triazine-2,4,6(1H,3H,5H)-trione and 2,4,6-triallyloxy-1,3,5-triazine.

7. A process of making strongly swellable, moderately crosslinked polyvinylpyrrolidone directly as fine, white powders which consists essentially of precipitation polymerizing vinyl pyrrolidone in the presence of a crosslinking agent and a free radical polymerization initiator in an organic solvent at a polymerization temperature of about 40° to 150° C.

8. A process according to claim 7 in which said organic solvent is an aliphatic hydrocarbon which is a $C_3$–$C_{10}$ saturated hydrocarbon, branched or unbranched, cyclic or acylic, or mixtures thereof.

9. A process according to claim 8 in which said solvent is cyclohexane or heptane.

10. A process according to claim 7 wherein the crosslinking agent is present in an amount of about 0.2 to 1% by weight of the vinyl pyrrolidone monomer.

11. A process according to claim 10 wherein said amount is about 0.25% to about 0.8%.

12. A process according to claim 11 wherein said amount is about 0.35 to 0.6%.

13. A process according to claim 7 which is run at about 10-50% solids.

14. A process according to claim 13 which is run at about 15-30% solids.

15. A process according to claim 7 in which a reactor is charged with the organic solvent, initiator is added, and a solution of vinyl pyrrolidone and crosslinker is introduced therein.

16. A process according to claim 15 wherein said solution is introduced below the surface of the solvent.

17. A process according to claim 7 wherein said polymerization temperature is about 50°-150° C.

18. A process according to claim 7 in which said yield of polymer powders is substantially quantitative.

19. A process according to claim 8 wherein the polymer has the characteristics given in claim 1.

20. A process according to claim 7 in which the polymer powders are recovered by filtering and drying, or directly by vacuum drying.

* * * * *